(12) United States Patent
Okandan

(10) Patent No.: US 7,540,469 B1
(45) Date of Patent: Jun. 2, 2009

(54) MICROELECTROMECHANICAL FLOW CONTROL APPARATUS

(75) Inventor: Murat Okandan, NE Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 670 days.

(21) Appl. No.: 11/043,588

(22) Filed: Jan. 25, 2005

(51) Int. Cl.
F16K 31/02 (2006.01)
(52) U.S. Cl. ................. 251/129.01; 138/40; 417/413.3
(58) Field of Classification Search ............ 251/129.01, 251/129.02; 138/40; 417/413.3
See application file for complete search history.

(56) References Cited

U.S. PATENT DOCUMENTS

| | | | |
|---|---|---|---|
| 3,342,754 A | | 9/1967 | Gorham |
| 4,520,375 A | * | 5/1985 | Kroll ..................... 417/413.3 |
| 4,581,624 A | * | 4/1986 | O'Connor .............. 251/129.06 |
| 4,921,723 A | * | 5/1990 | Nichols et al. ............... 427/488 |
| 5,441,597 A | * | 8/1995 | Bonne et al. .................... 216/2 |
| 5,501,893 A | | 3/1996 | Laermer et al. |
| 5,736,430 A | * | 4/1998 | Seefeldt et al. ............... 438/53 |
| 5,804,084 A | | 9/1998 | Nasby et al. |
| 6,089,534 A | | 7/2000 | Biegelsen et al. |
| 6,116,863 A | * | 9/2000 | Ahn et al. .................... 417/322 |
| 6,141,139 A | * | 10/2000 | Furlani et al. ............... 359/280 |
| 6,182,941 B1 | * | 2/2001 | Scheurenbrand et al. ............................................................... 251/129.01 |
| 6,362,018 B1 | * | 3/2002 | Xu et al. ...................... 438/50 |
| 6,443,179 B1 | | 9/2002 | Benavides et al. |
| 6,471,675 B1 | | 10/2002 | Rogers et al. |
| 6,531,331 B1 | | 3/2003 | Wise et al. |
| 6,548,895 B1 | | 4/2003 | Benavides et al. |
| 6,561,224 B1 | | 5/2003 | Cho |
| 6,590,267 B1 | | 7/2003 | Goodwin-Johansson et al. |
| 6,619,311 B2 | | 9/2003 | O'Connor et al. |

(Continued)

OTHER PUBLICATIONS

Matthew S. Stay, "Simulation, Design, and Performance of Surface Micromachined Peristaltic Pumps", A thesis submitted to the Faculty of the Graduate School of the Univ. of CO in partial fulfillment of requirement for the degree of Master's of Science, University of Minnesota Dec. 15, 2000.

(Continued)

*Primary Examiner*—Stephen M Hepperle
*Assistant Examiner*—Andrew J Rost
(74) *Attorney, Agent, or Firm*—John P. Hohimer

(57) ABSTRACT

A microelectromechanical (MEM) flow control apparatus is disclosed which includes a fluid channel formed on a substrate from a first layer of a nonconducting material (e.g. silicon nitride). A first electrode is provided on the first layer of the nonconducting material outside the flow channel; and a second electrode is located on a second layer of the nonconducting material above the first layer. A voltage applied between the first and second electrodes deforms the fluid channel to increase its cross-sectional size and thereby increase a flow of a fluid through the channel. In certain embodiments of the present invention, the fluid flow can be decreased or stopped by applying a voltage between the first electrode and the substrate. A peristaltic pumping of the fluid through the channel is also possible when the voltage is applied in turn between a plurality of first electrodes and the substrate. A MEM flow control assembly can also be formed by providing one or more MEM flow control devices on a common substrate together with a submicron filter. The MEM flow control assembly can optionally include a plurality of pressure sensors for monitoring fluid pressure and determining flow rates through the assembly.

28 Claims, 11 Drawing Sheets

U.S. PATENT DOCUMENTS

| | | | |
|---|---|---|---|
| 6,622,872 B1 * | 9/2003 | Tai et al. | 210/490 |
| 7,090,471 B2 * | 8/2006 | Xie et al. | 417/413.3 |
| 2003/0080060 A1 * | 5/2003 | Gulvin | 210/650 |
| 2004/0253123 A1 * | 12/2004 | Xie et al. | 417/410.1 |

OTHER PUBLICATIONS

Nam-Trung Nguyen, Audra H. Meng, Justin Black, Richard M. White, "Integrated flow sensor for in situ measurement and control of acoustic streaming in flexural plate wave micropumps", Elsevier Science Sensors and Actuators vol. 70, (2000) pp. 115-121.

* cited by examiner

MICROELECTROMECHANICAL FLOW CONTROL APPARATUS

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to microelectromechanical devices, and in particular to a microelectromechanical flow control device which has applications for microfluidics.

BACKGROUND OF THE INVENTION

Surface and bulk micromachining have been developed in recent years to allow the batch fabrication of many different types of electromechanical devices using processes which are well-known in the semiconductor integrated circuit (IC) industry. Micromachining is also revolutionizing the field of microfluidics by allowing microfluidic devices to be fabricated in sizes and with a complexity that has not been possible heretofore.

The present invention is directed to a microelectromechanical (MEM) flow control apparatus which can be fabricated by a combination of surface and bulk micromachining. This MEM flow control apparatus has potential application wherever a small controlled rate of a fluid is to be dispensed (e.g. for drug delivery), and can be formed in combination with a submicron filter and pressure sensors on the same substrate.

In one mode of operation, the MEM flow control apparatus of the present invention provides a field-free channel wherein the flow of the fluid can be regulated.

In other modes of operation, the MEM flow control apparatus of the present invention can be used to increase, decrease, stop the flow of a fluid.

In yet another mode of operation the MEM flow control apparatus can operate as a peristaltic pump to assist the flow of a fluid.

These and other advantages of the present invention will become evident to those skilled in the art.

SUMMARY OF THE INVENTION

The present invention relates to a microelectromechanical flow control apparatus which comprises a substrate; a first layer of a nonconducting material disposed over the substrate to form a fluid channel having an inlet port and an outlet port; a first electrode formed on the first layer of the nonconducting material outside of the fluid channel; a second layer of the nonconducting material disposed above the first layer of the nonconducting material; and a second electrode formed on an upper surface of the second layer of the nonconducting material. The first layer of the nonconducting material can be deformed (i.e. bowed under stress) away from the substrate to increase a cross-sectional size of the fluid channel in response to a voltage applied between the first and second electrodes. With the voltage applied, the fluid channel is substantially free from any electric field. This is advantageous for preventing electrolysis within a fluid disposed in the channel.

The nonconducting material can comprise, for example, silicon nitride. The substrate can comprise silicon; and the first and second electrodes can comprise polycrystalline silicon, or a metal, or both. The inlet port, or the outlet port, or both can extend completely through the substrate to a backside thereof.

The substrate can be made electrically conductive to provide a third electrode beneath the channel. Then, when the voltage is applied between the first electrode and the substrate, the first layer of the nonconducting material can be deformed towards the substrate to decrease a cross-sectional size of the fluid channel to reduce or even stop a flow of a fluid provided therein.

Although the materials used to construct the MEM flow control apparatus including silicon, polysilicon, silicon nitride are all biocompatible, nevertheless the fluid channel and other exposed elements of the flow control apparatus can be optionally lined (i.e. covered) with a layer of a biocompatible material such as parylene. The parylene, which also provides electrical insulation, can be used to cover exterior surfaces of the MEM flow control apparatus and any electrical wiring thereto.

In certain embodiments of the present invention, a submicron filter can be formed on the substrate proximate to the fluid channel and operatively connected thereto. This filter can provide filtration of submicron particles in a fluid, with particles having a predetermined size of, for example, 0.2 µm or larger being trapped in the filter. The submicron filter comprises a plurality of filtration channels operatively connected in parallel between a filter inlet and a filter outlet. A lining of parylene can be optionally provided to cover surfaces of the submicron filter which are to be exposed to the fluid.

When the MEM flow control apparatus includes a submicron filter to form a MEM flow control assembly, a first pressure sensor can be operatively connected to the filter inlet of the submicron filter; and a second pressure sensor can be operatively connected to the filter outlet thereof. This allows a pressure differential across the submicron filter to be determined in order to determine a flow rate through the filter and also to determine when or if the submicron filter is clogged with trapped particles. Each pressure sensor can comprise a pressure diaphragm, and one or more piezoresistors formed on an outer surface of the pressure diaphragm.

A third pressure sensor can be operatively connected to the outlet port of the fluid channel, with the third pressure sensor having the same construction as the first and second pressure sensors. The determination of a pressure differential between the second and third pressure sensors can be used to determine the flow rate through the fluid channel.

The present invention also relates to a MEM flow control apparatus which comprises a silicon substrate; a first layer of silicon nitride disposed over the silicon substrate to form a fluid channel operatively connected between an inlet port and an outlet port; a first electrode formed on the first layer of silicon nitride outside of the fluid channel; a second layer of silicon nitride disposed above the first layer of silicon nitride; and a second electrode formed on an upper surface of the second layer of silicon nitride. The first layer of silicon nitride can be deformed away from the substrate to increase a cross-sectional size of the fluid channel when a voltage is applied between the first and second electrodes. As previously mentioned, the fluid channel is substantially free of any electric field due to the voltage applied between the first and second electrodes.

The inlet port, or the outlet port, or both can extend completely through the substrate to a backside thereof. The first and second electrodes can comprise polycrystalline silicon, or a metal, or both. The fluid channel can be optionally lined with a conformal layer of parylene. When the silicon substrate is electrically conductive, the first layer of silicon nitride can also be deformed towards the substrate to decrease a cross-sectional size of the fluid channel by applying the voltage between the first electrode and the substrate.

The present invention further relates to a microelectromechanical (MEM) flow control assembly for use with a fluid. The MEM flow control assembly comprises a substrate; at least one MEM flow control apparatus formed on the substrate, with each MEM flow control apparatus further comprising a first layer of a nonconducting material disposed over the substrate to form a fluid channel having an inlet port and an outlet port; a first electrode formed on the first layer of the nonconducting material outside of the fluid channel; a second layer of the nonconducting material disposed above the first layer of the nonconducting material; and a second electrode formed on above the second layer of the nonconducting material, with the first layer of the nonconducting material being deformable away from the substrate to increase a cross-sectional size of the fluid channel in response to a voltage applied between the first and second electrodes. The MEM flow control assembly also comprises a submicron filter operatively connected to the inlet port of each MEM flow control apparatus to remove any particles in the fluid which have dimensions larger than a fraction of a micron (e.g. $\geq \frac{1}{5}$ μm), with the submicron filter further comprising a plurality of filtration channels operatively connected in parallel between a filter inlet and a filter outlet. The fluid channel can be optionally lined with a layer of parylene.

The MEM flow control assembly can further comprise one or more pressure sensors formed on the substrate and operatively connected to measure the pressure of the fluid. Each pressure sensor can comprise a pressure diaphragm, with a piezoresistor being disposed, at least in part, over an outer surface of the pressure diaphragm.

The present invention also relates to a method for controlling a fluid flow. The method comprises providing a microelectromechanical (MEM) flow control apparatus having a nonconductive membrane suspended over a substrate to form a fluid channel; a first electrode disposed on the nonconductive membrane outside the fluid channel; and a second electrode superposed above the first electrode. The method also comprises the steps of supplying a fluid to an inlet port of the MEM flow control apparatus under pressure, and providing a limited flow of the fluid between the inlet port and an outlet port of the MEM flow control apparatus; and increasing the flow of the fluid between the inlet port and the outlet port by applying a voltage between the first electrode and the second electrode and thereby urging the nonconductive membrane away from the substrate to increase a cross-sectional size of the fluid channel.

Additionally, the method can comprise providing a submicron filter on the substrate proximate to the MEM flow control apparatus, and filtering the fluid with the submicron filter prior to supplying the fluid to the inlet port of the MEM flow control apparatus under pressure. The method can also comprise providing a first pressure sensor on the substrate, with the first pressure sensor being operatively connected to an inlet side of the submicron filter, and sensing the pressure of the fluid entering the submicron filter with the first pressure sensor. The method can further comprise providing a second pressure sensor on an outlet side of the submicron filter, and sensing the pressure of the fluid exiting the submicron filter with the second pressure sensor. The method can further include a step of sensing a flow rate through the submicron filter by determining a difference in pressure between the pressure of the fluid entering the submicron filter and the pressure of the fluid exiting the submicron filter.

A third pressure sensor can also be provided on the substrate operatively connected to the outlet port of the fluid channel to sense the pressure of the fluid exiting the fluid channel at the outlet port thereof. A flow rate through the fluid channel can also be sensed by determining the difference in the pressure of the fluid exiting the submicron filter and the pressure of the fluid exiting the fluid channel at the outlet port thereof.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1A:
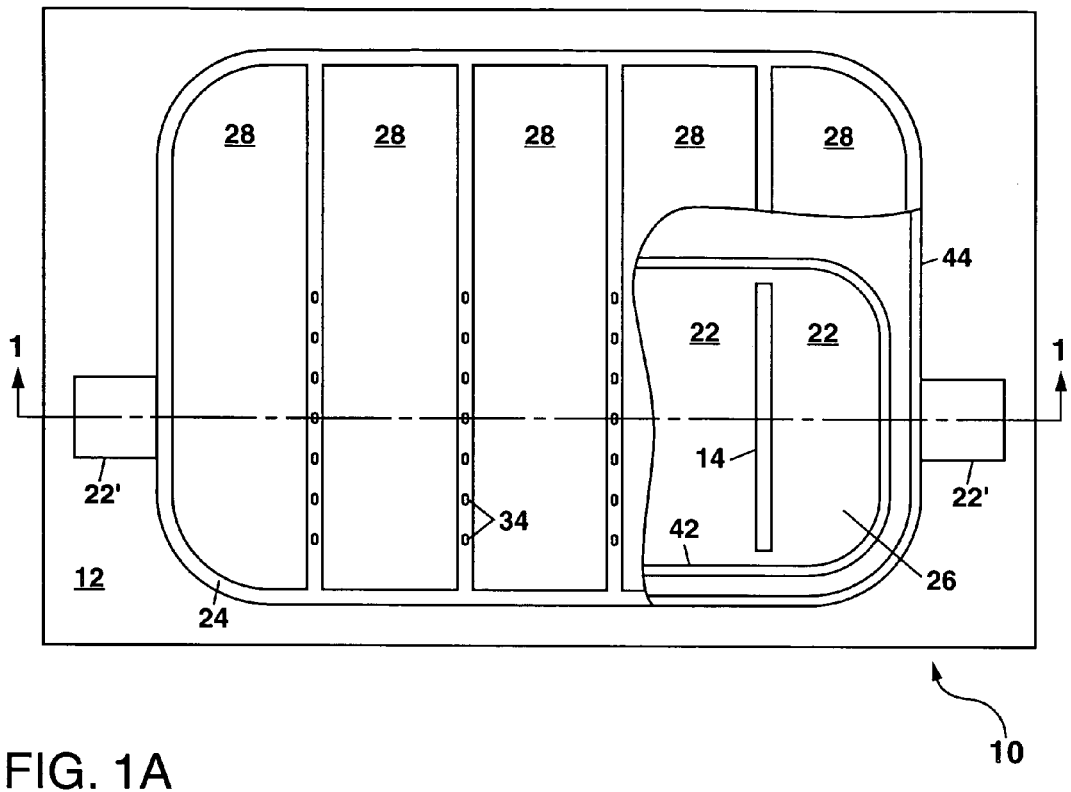
FIG. 1A shows a partial cutaway schematic plan view a first example of a MEM flow control apparatus according to the present invention.
Figure 1B:
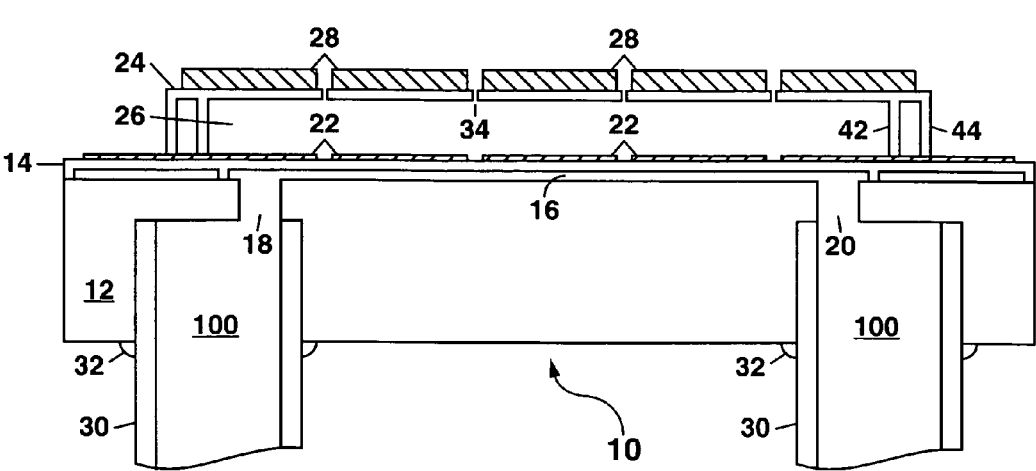
FIG. 1B shows a schematic cross-section view of the device of FIG. 1A taken along the section line 1-1 in FIG. 1A.

Referring to FIGS. 1A and 1B, there is shown schematically a partial cutaway plan view and a cross-section view, respectively, of a first example of a microelectromechanical (MEM) flow control apparatus 10 according to the present invention. The cross-section view of FIG. 1B is taken along the section line 1-1 in FIG. 1A.

The MEM flow control apparatus 10 in FIGS. 1A and 1B comprises a substrate 12. A first layer 14 of a nonconducting (i.e. not electrically conductive) material is disposed over the substrate 12 to form a fluid channel 16, with the fluid channel 16 having an inlet port 18 and an outlet port 20. One or more first electrodes 22 can be formed on the first layer 14 of the nonconducting material, with the first electrodes 22 being located outside of the fluid channel 16. In a cutaway portion of FIG. 1A, the first electrodes 22 are shown segmented but electrically connected together at their outer edges. This allows an external electrical connection to be made to the first electrodes 22 via a portion 22' of the first electrodes 22 which extends outward therefrom. In other embodiments of the present invention, each first electrode 22 can be separately electrically contacted, or a single first electrode 22 can be provided which is not segmented (see FIG. 6).

A second layer 24 of the nonconducting material is disposed above the first layer 14 to form a cavity 26 therebetween. One or more second electrodes 28 can be formed on an upper surface of the second layer 24 of the nonconducting material. The electrodes 22 and 28 can extend beyond the cavity 26 as shown in FIG. 1A to form bond pads for electrical connections to be made to the device 10.

The device 10 in FIGS. 1A and 1B can have lateral dimensions of up to a few millimeters and can be on the order of one millimeter thickness. The MEM flow control apparatus 10 can be packaged using electro-microfluidic packaging technology (see e.g. U.S. Pat. Nos. 6,443,179 and 6,548,895 which are incorporated herein by reference). Alternately, fluidic connections can be made directly to the device 10 using microfluidic tubing 30 which can be on the order of 1 millimeter in diameter. This can be done by inserting the tubing 30 into the inlet and outlet ports, 18 and 20, which, in the example of FIGS. 1A and 1B, extend through the substrate 12. The microfluidic tubing 30 can be attached in place using an adhesive 32 (e.g. a ultraviolet-cured epoxy).

The dimensions of the fluid channel 16 can be sized to provide a predetermined flow of a fluid through the apparatus 10 in the absence of any voltage being applied between the first and second electrodes, 22 and 28. The height of the fluid channel 16 can be, for example, about one micron or less, with the width and length of the fluid channel 16 being from a few microns up to a few millimeters.

Figure 2A:
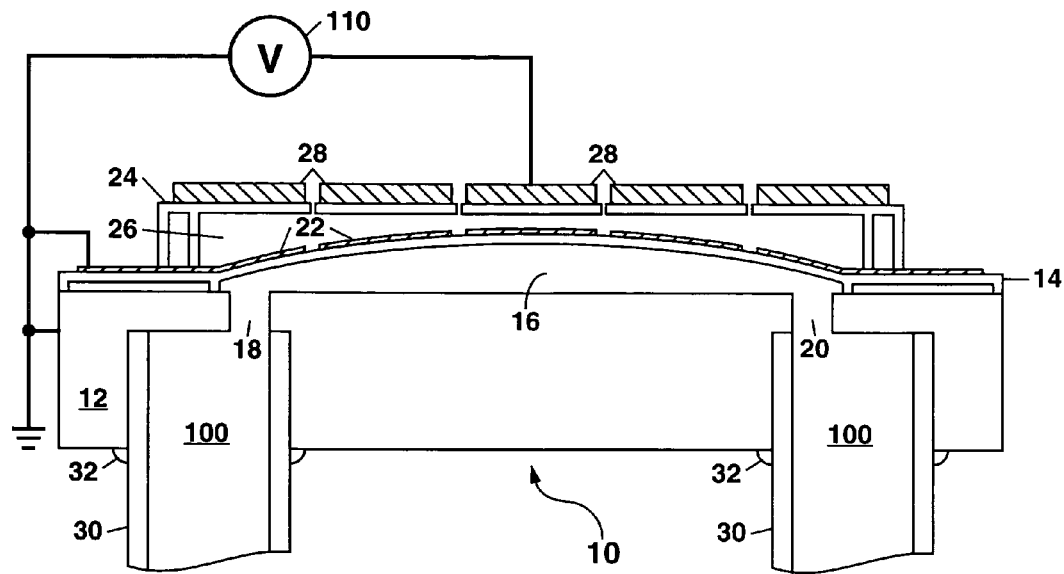
FIG. 2A illustrates operation of the device of FIGS. 1A and 1B to increase the flow of a fluid through the device.

The flow of a fluid 100 supplied to the device 10 at the inlet port 18 can be increased in response to a voltage applied between the electrodes 22 and 28 from a voltage source 110, with the voltage generally being up to about 100 Volts, and with an amount of upward deflection of the first layer 14 depending upon the magnitude of the applied voltage 110. In this mode of operation as illustrated in FIG. 2A, the first electrodes 22 can be held at ground electrical potential; with the voltage being applied to one or more of the second electrodes 28. The applied voltage 110 produces an electric field across the cavity 26 between the electrodes 22 and 28 which are spaced up to a few microns apart. The electric field produced by the applied voltage 110 generates an electrostatic force of attraction between the electrodes 22 and 28 which urges the first layer 14 of the nonconducting material towards the second electrodes 28 and away from the substrate 12. This stretches and bows a portion of the first layer 14 upward toward the second electrodes 28 while the periphery of the first layer 14 remains fixed in place attached to the substrate 12 and to the sidewalls of the cavity 26. This deforms the first layer 14 from its substantially planar position.

The electrostatic force of attraction resulting from the applied voltage 110 deforms the first layer 14 of the nonconducting material upward to increase a cross-sectional size of the fluid channel 16. This, in turn, allows an increased flow of the fluid 100 through the channel 16. The exact deformation of the first layer 14 of the nonconductive material will depend upon the magnitude of the applied voltage 110, and also on how the voltage 110 is applied to the device 10 (i.e. to which of the first and second electrodes 22 and 28 the voltage 110 is applied). When the first layer 14 is deformed upward, the flow rate through the fluid channel 16 can be increased by up to several hundred percent or more over the flow in the absence of any applied voltage 110. The second layer 24 of the nonconducting material, which is located between the first and second electrodes, 22 and 28, prevents any short circuiting of the voltage 110 under normal operating conditions since the electrodes 22 and 28 do not directly contact each other.

In FIG. 2A, since the voltage 110 is applied between the first and second electrodes 22 and 28, the electric field exists entirely within the cavity 26 so that the fluid channel 16 is substantially free of any electric field so that the fluid 100 will not be affected by the electric field. This is advantageous to prevent the possibility for electrolysis or other electric field-induced chemical reactions which might otherwise deleteriously affect the fluid 100, for example, when the apparatus 10 is used to dispense a saline solution containing one or more drugs (e.g. for pain control). Additionally, the electrostatic nature of the MEM flow control device 10 provides operation with a relatively low electrical power consumption and prevents any unwanted heating of the fluid 100.

During actuation of the first and second electrodes, 22 and 28, to increase the cross-section size of the fluid channel 16, the substrate can be optionally electrically grounded as shown in FIG. 2A. This can be done by using a substrate 12 which is doped for electrical conductivity (e.g. p-type doped with phosphorous to about $10^{16}$-$10^{18}$ cm$^{-3}$).

The MEM flow control apparatus 10 in the example of FIGS. 1A and 1B also includes a plurality of openings 34 through the second layer 24 of the nonconductive material. These openings 34, which are generally necessary for the fabrication of the device 10 in the example of FIGS. 1A and 1B, also serve to equilibrate the ambient (e.g. air) within the cavity 26 when the first layer 14 of the nonconductive material moves upon actuation of the device 10. In other embodiments of the present invention, the openings 34 can be plugged (e.g. with silicon nitride or parylene) after removing a sacrificial material 36 from the cavity 26.

Figure 2B:
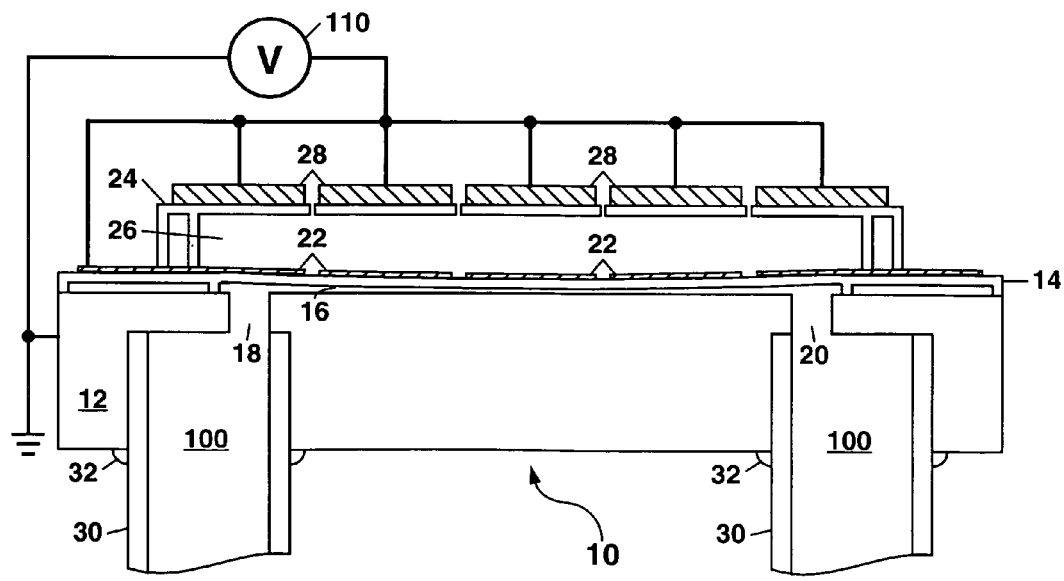
FIG. 2B illustrates operation of the device of FIGS. 1A and 1B to decrease or stop the flow of the fluid through the device.

FIG. 2B illustrates another mode of operation of the MEM flow control apparatus 10 which can be useful for certain applications of the device 10. In this mode of operation, the cross-section size of the fluid channel 16 can be reduced to reduce or even shut off completely a flow of the fluid 100 through the channel 16. This can be done by electrically grounding the substrate 12 and applying the voltage 110 between one or more of the first electrodes 22 and the substrate 12. In this mode of operation, which does produce an electric field across the fluid channel 16, the first electrodes 22 and the supporting first layer 14 of the nonconductive material are urged downward by an electrostatic force of attraction between the first electrodes 22 and the substrate 12. The voltage 110 can also be optionally supplied to the second electrodes 28 as shown in FIG. 2B. For this mode of operation of the device 10, the voltage 110 can also range up to about 100 Volts or more, with an amount of downward deflection of the first layer 14 depending upon the magnitude of the applied voltage 110.

In other embodiments of the present invention, the MEM flow control apparatus can have a plurality of first electrodes 22 which are electrically isolated from one another and independently contacted. In such a device 10, another mode of operation is possible which provides a peristaltic pumping operation to assist in transporting a fluid 100 through the channel 16, or can be the sole mode of transfer of the fluid 100 through the channel 16. This mode of operation, which is based on actuating the first electrodes 22 in sequence, can be understood with reference to FIGS. 3A-3C.

Figure 3A:
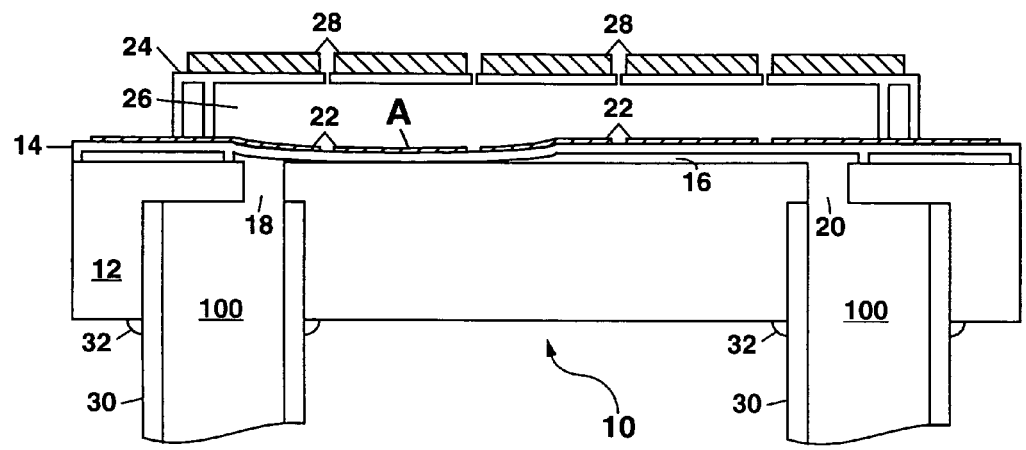
FIGS. 3A-3C illustrates operation of the device of FIGS. 1A and 1B to provide a peristaltic pumping of the fluid through the device.
Figure 3B:
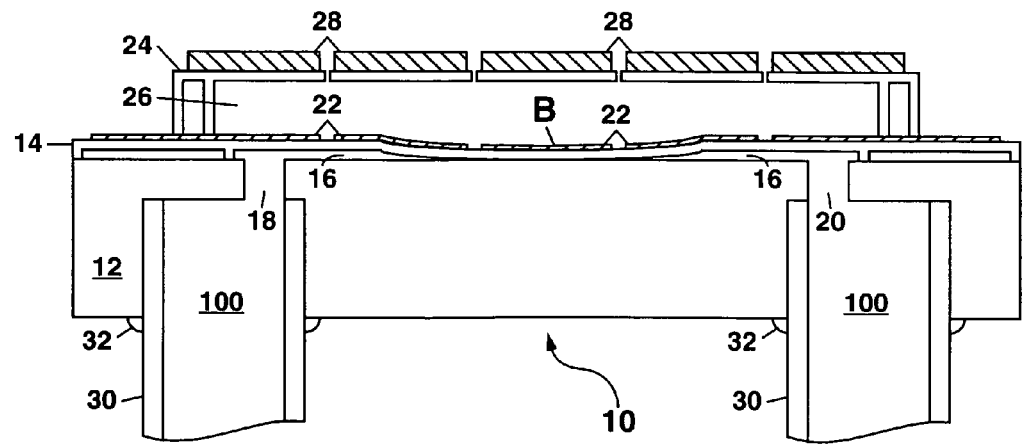
Figure 3C:
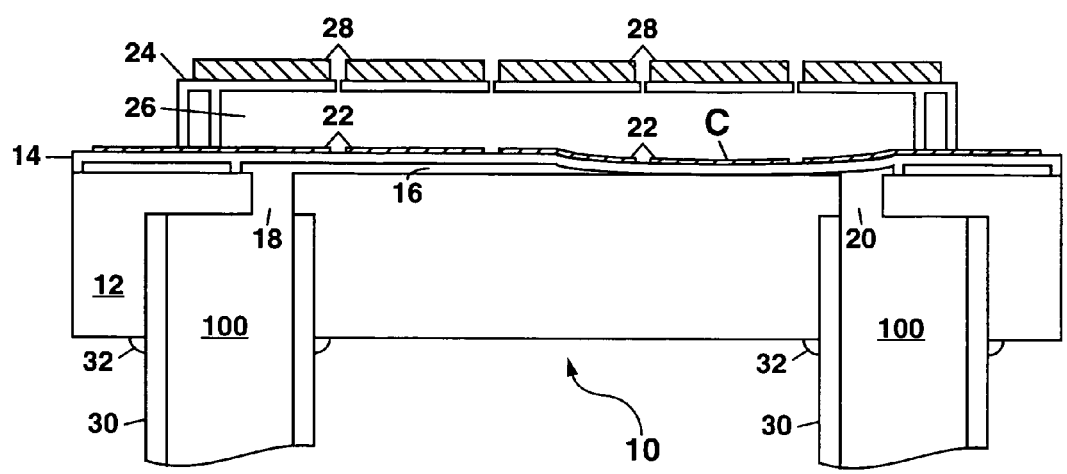

In FIG. 3A, to initiate the peristaltic pumping, the voltage 110 can be applied between a first electrode 22 near the inlet port 18 (e.g. the electrode labelled "A" in FIG. 3A) and the substrate 12. This urges the electrode "A" and a portion of the first layer 14 connected to electrode "A" to move downwards towards the substrate 12. The voltage 110 can then be applied between an adjacent first electrode 22 (e.g. the electrode labelled "B") and the substrate 12 to urge another portion of the first layer 14 to move towards the substrate 12 thereby urging the fluid 100 to move along the channel 16 towards the outlet port 20. This is shown in FIG. 3B after the voltage 110 has been removed from the electrode "A" to allow additional fluid 100 to enter the channel 16 at the inlet port 18. In FIG. 3C, the voltage 110 can be applied to another adjacent electrode 22 (e.g. the electrode labelled "C" to urge a portion of the first layer 14 underlying the electrode "C" to move downward towards the substrate 12 and further move the fluid 100 along the channel 16 towards the outlet port 20. The above steps of actuating electrodes "A", "B" and "C" in sequence can be continued to pump the fluid 100 from the inlet port 18 to the outlet port 20 as needed. Those skilled in the art will understand that other modes of activating the first electrodes 22 are possible to pump the fluid 100 through the channel 16, including activating the electrodes 22 in sets.

During activation of the first electrodes 22, the second electrode 28 superposed above each activated first electrode 22 can also be optionally activated with the same voltage 110 to prevent an electrostatic force of attraction from being developed between the electrodes 22 and 28.

Other modes of peristaltic pumping are also possible with the MEM flow control apparatus 10 of the present invention. For example, the voltage 110 can be applied in turn between one of the electrodes "A," "B," and "C" and a second electrode 28 superposed thereabove. This can provide an upward undulating motion of first layer 14 which urges the fluid 100 to move along the channel 16 towards the outlet port 20 as the voltage 110 is sequentially removed from between each electrode "A," "B," and "C" and the second electrode 28, thereby allowing a portion of the first layer 14 corresponding to where the voltage 110 has been removed to spring back towards the substrate 12. As another example, the electrodes "A," "B," and "C" and the portions of the first layer 14 attached thereto can be sequentially moved upwards towards the second electrodes 28 and then downwards towards the substrate 12 by alternately applying the voltage 110 between each electrode "A," "B," and "C" and one of the second electrodes 28, and then applying the voltage 110 between that same electrode "A," "B," or "C" and the substrate 12. This can provide a much larger amplitude of the undulating motion of the first layer 14 than that shown in FIGS. 3A-3C, thereby providing an increased rate of pumping of the fluid 100 from the inlet port 18 to the outlet port 20.

Fabrication of the first example of the MEM flow control apparatus 10 will now be described in detail with reference to FIGS. 4A-4L which show schematic cross-section views along the section line 1-1 in FIG. 1A. The MEM flow control apparatus 10 can be fabricated using a combination of surface and bulk micromachining which is based on well-known integrated circuit (IC) processing steps, including material deposition, photolithography, masking, etching, mask stripping, and cleaning which are repeated numerous times, as needed, to build up the structure of the apparatus 10. A plurality of layers of materials including polycrystalline silicon (also termed polysilicon), silicon nitride, and a sacrificial material such as silicon dioxide or a silicate glass can be deposited to build up the structure of the device 10 layer by layer.

The term "patterning" as used herein refers to a sequence of well-known processing steps including applying a photoresist to the substrate 12, prebaking the photoresist, aligning the substrate 12 with a photomask, exposing the photoresist through the photomask, developing the photoresist, baking the wafer, etching away the surfaces not protected by the photoresist (e.g. by reactive ion etching), and stripping the protected areas of the photoresist so that further processing can take place. The term "patterning" can further include the formation of a hard mask (e.g. comprising about 500 nanometers of a silicate glass termed TEOS deposited from the decomposition of tetraethylortho silicate by low-pressure chemical vapor deposition at about 750° C. and densified by a high temperature processing) overlying a polysilicon or sacrificial material layer in preparation for defining features into the layer by etching.

Figure 4A:
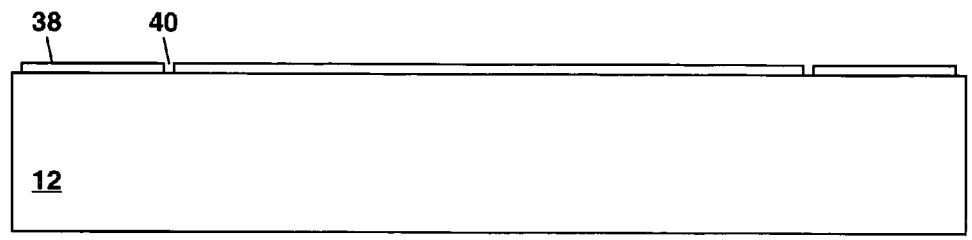
FIGS. 4A-4L show schematic cross-section views to illustrate fabrication of the device of FIGS. 1A and 1B by a combination of surface and bulk micromachining.

In FIG. 4A, a substrate 12 is provided which generally comprises silicon, although those skilled in the art will understand that any type of substrate useful for micromachining can be used for practice of the present invention, including a substrate comprising a semiconductor, glass, fused silica, quartz, ceramic, or metal. Generally, the substrate 12 is sized to allow the fabrication of a plurality of devices 10 in a batch process, with individual devices 10 then being separated for packaging and use.

A layer 38 of a thermal oxide is initially formed to blanket the substrate 12 to a predetermined layer thickness which will ultimately determine a height for the fluid channel 16 to be formed in the device 10. The thermal oxide can be, for example, 0.3-0.6 µm thick and can be formed over the entire substrate 12 by a conventional wet oxidation process carried out at an elevated temperature (e.g. 1050° C. for up to 1.5 hours or more). After formation, the thermal oxide layer 38 can be patterned to form an annular opening 40 about 1-2 µm wide to the shape for the fluid channel 16 which will be built up from a subsequently-deposited first layer 14 of the nonconducting material. In other embodiments of the present invention the layer 38 can be blanket deposited by chemical vapor deposition (CVD) and comprise silicon dioxide or a silicate glass (e.g. TEOS).

Figure 4B:
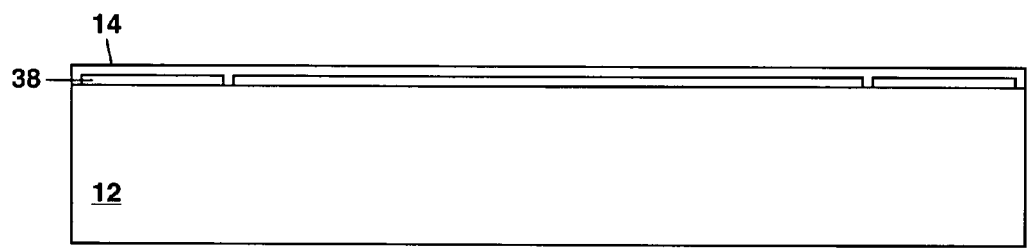

In FIG. 4B, the first layer 14 of the nonconducting material can be blanket deposited over the substrate 12 and to fill in the annular opening 40. The nonconducting material can comprise, for example, silicon nitride. The silicon nitride can be a low-stress silicon nitride which is deposited using low-pressure chemical vapor deposition (LPCVD) at about 850° C. The thickness of the first layer 14 can be, for example, 0.8 µm.

Figure 4C:
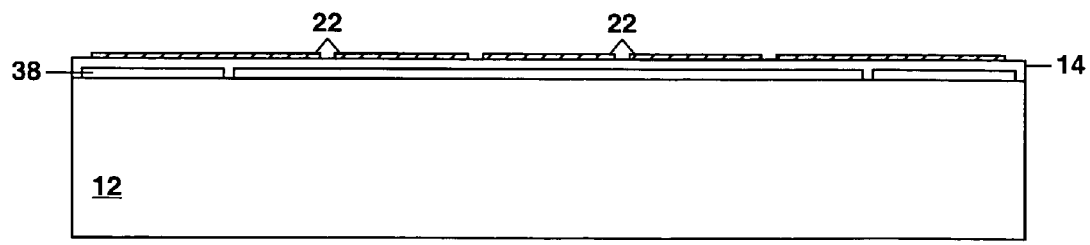

In FIG. 4C, a layer of polysilicon can be blanket deposited over the first layer 14 and patterned to form one or more first electrodes 22. This polysilicon layer can be, for example, 0.3 µm thick and can be deposited by LPCVD at about 580° C. The polysilicon layer can be doped for electrical conductivity during deposition using phosphorous, or alternately after deposition using ion implantation or dopant diffusion. After deposition and patterning, the polysilicon layer can be annealed at a high temperature (e.g. at about 1100° C. for three hours) to remove any stress therein.

Figure 4D:
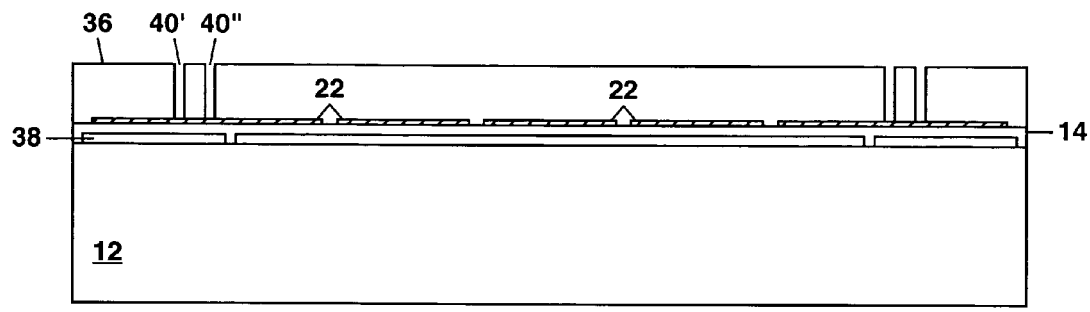

In FIG. 4D, a sacrificial material 36 can be blanket deposited over the substrate 12 to a thickness of, for example, 2 µm using CVD. The sacrificial material 36 can comprise silicon dioxide or a silicate glass (e.g. TEOS). After deposition, the sacrificial material 36 can be planarized, if needed. This can be done, for example, using chemical-mechanical polishing as known to the art (see e.g. U.S. Pat. No. 5,804,084 which is incorporated herein by reference). Once the sacrificial material 36 has been blanket deposited over the substrate 12 and planarized, if needed, then the sacrificial material 36 can be patterned to form additional annular openings 40' and 40" therein at locations for an inner sidewall 42 and an outer sidewall 44 of the cavity 26 which is being built up. The annular openings 40' and 40" can be, for example, 1-2 μm wide.

Figure 4E:
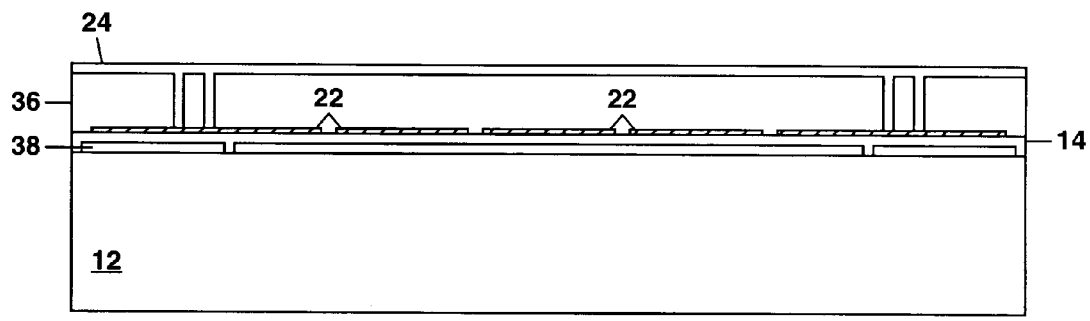

In FIG. 4E, the second layer 24 of the nonconducting material is blanket deposited over the substrate 12 and also fills in the openings 40' and 40". The second layer 24 of the nonconducting material can comprise silicon nitride which can be deposited by LPCVD as described previously. The thickness of the second layer 24 can be, for example, 0.8 μm.

Figure 4F:
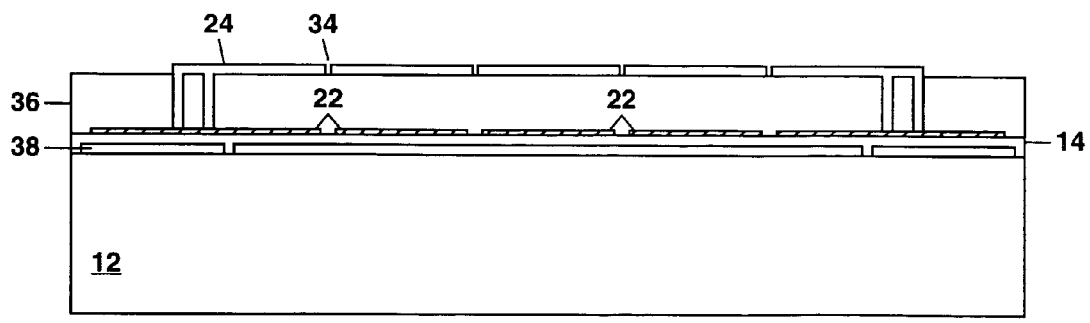

In FIG. 4F, the second layer 24 of the nonconducting material can be patterned to remove portions of the second layer 24 outside the openings 40' and also to form a plurality of openings 34 through the second layer 24.

Figure 4G:
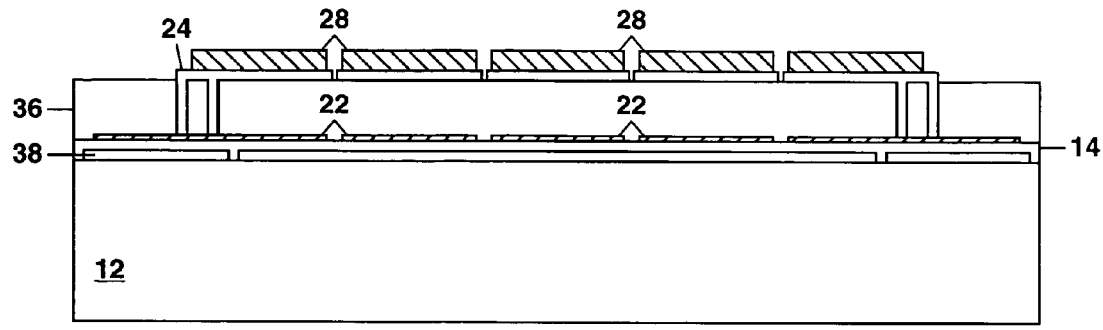

In FIG. 4G, another layer of polysilicon is blanket deposited over the substrate 12 by LPCVD at about 580° C., and is then patterned to form one or more second electrodes 24, with each second electrode 24 preferably being superposed above one of the first electrodes 22. This layer of polysilicon can be, for example, 2.25 μm thick and can be doped for electrical conductivity with phosphorous.

Figure 4H:
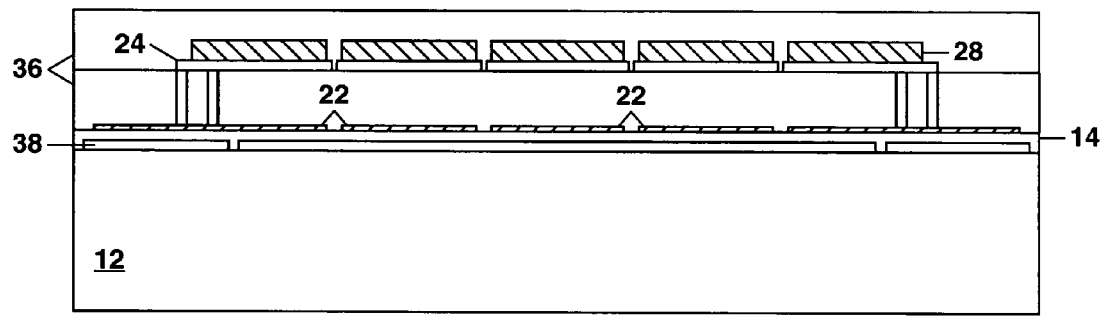

In FIG. 4H, another layer of the sacrificial material 36 can be blanket deposited over the substrate 12 to encapsulate the second electrodes 24 in preparation for a final annealing step when this is needed to remove stress from the polysilicon layers forming the first and electrodes 22 and 28. The final annealing step, if needed, can be carried out at about 1100° C. for three hours.

After buildup of the MEM flow control device 10 on the substrate 12, a backside 46 of the substrate 12 can be bulk micromachined to form the inlet port 18 and the outlet port 20. This can be done using a deep reactive ion etch (DRIE) process as disclosed in U.S. Pat. No. 5,501,893 to Laermer, which is incorporated herein by reference. The DRIE process for bulk micromachining utilizes an iterative Inductively Coupled Plasma (ICP) deposition and etch cycle wherein a polymer etch inhibitor is conformally deposited as a film over a portion of the substrate 12 being etched to form the inlet port 18 and the outlet port 20, and then subsequently removed during an etching cycle. The DRIE process for bulk micromachining can produce substantially vertical sidewalls with little or no tapering.

Figure 4I:
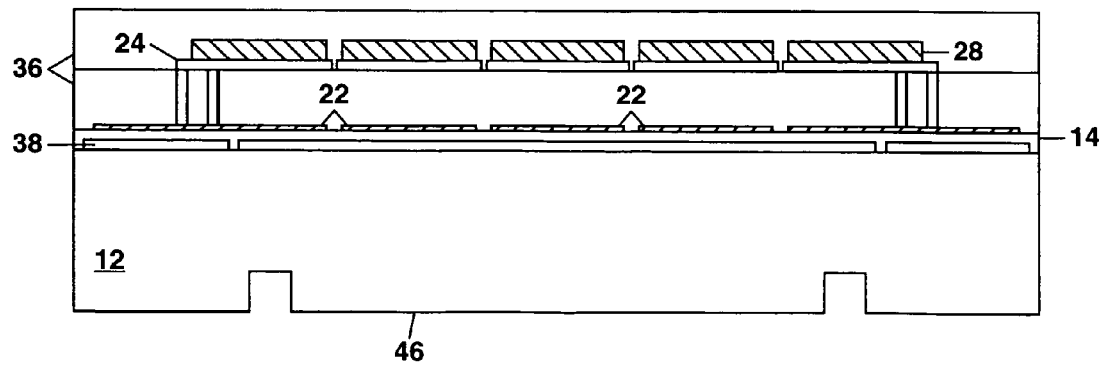
Figure 4J:
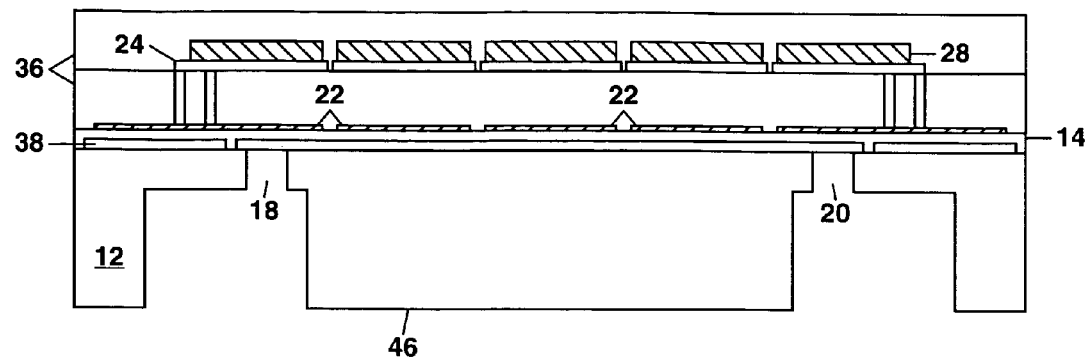
Figure 4K:
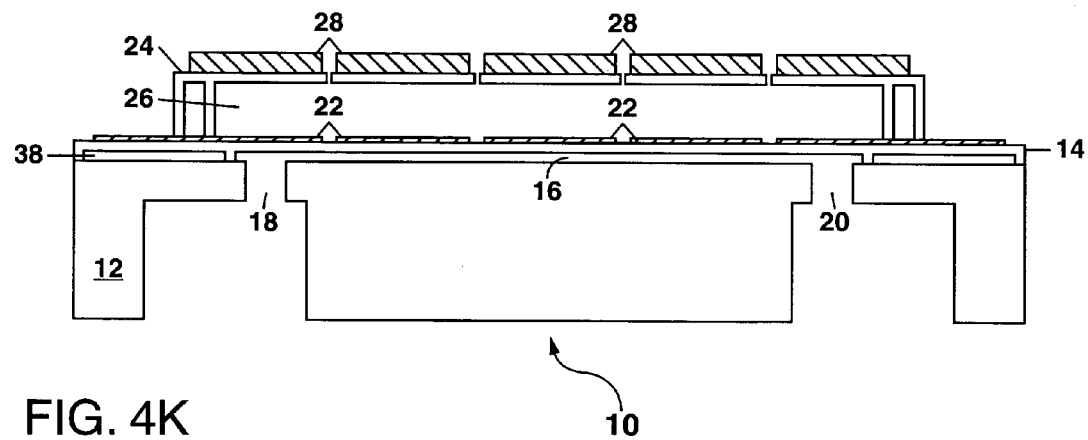

In FIG. 4I, a first DRIE etch step can be used with a first etch mask (not shown) to etch partway through the substrate 12 from the backside 46 thereof. A second DRIE etch step can then be used with a second etch mask (not shown) to etch completely through the substrate 12 as shown in FIG. 4J. The second DRIE etch step retains an etch profile generated by the first DRIE etch step and moves this etch profile through the substrate 12 from the backside 46 to a front side thereof, as the second DRIE etch step etches another profile into the backside 46 of the substrate 12 as determined by the second etch mask. By using two DRIE etch steps, the inlet and outlet ports, 18 and 20, can thus be made with stepped sidewalls with different diameters (e.g. one or more holes having a smaller diameter of 10-50 μm and a single hole having a larger diameter of 0.5-1 millimeter). This is advantageous to accommodate microfluidic tubing 30 having a diameter of, for example, 0.5-1 millimeter, and to provide a fluidic connection to the channel 16 which can have a width that is generally smaller than the diameter of the tubing 30.

In 4K, the sacrificial material 36 can be removed from the device 10 to free up for movement the electrodes, 22 and 28, and the first and second layers, 14 and 24, of the nonconductive material. Removal of the sacrificial material 36 can be performed by immersing the substrate 12 into a selective wet etching solution comprising hydrofluoric acid (HF) for a time period of up to several hours or overnight. The HF etching solution chemically attacks and dissolves away any exposed sacrificial material 36 while attacking other materials including silicon, polysilicon and silicon nitride to a much smaller extent so that these other materials are retained in place while the sacrificial material 36 is removed. Portions of the sacrificial material 36 which are completely encapsulated within the device 10 are retained to provide structural stability between the inner and outer sidewalls, 42 and 44, of the cavity 26. The thermal oxide layer 38 within the fluid channel 16 is also removed by the HF etching solution to open up the channel 16 while other portions of the thermal oxide layer 38 encapsulated beneath the first layer 14 outside the channel 16 are retained in the completed device 10.

Figure 4L:
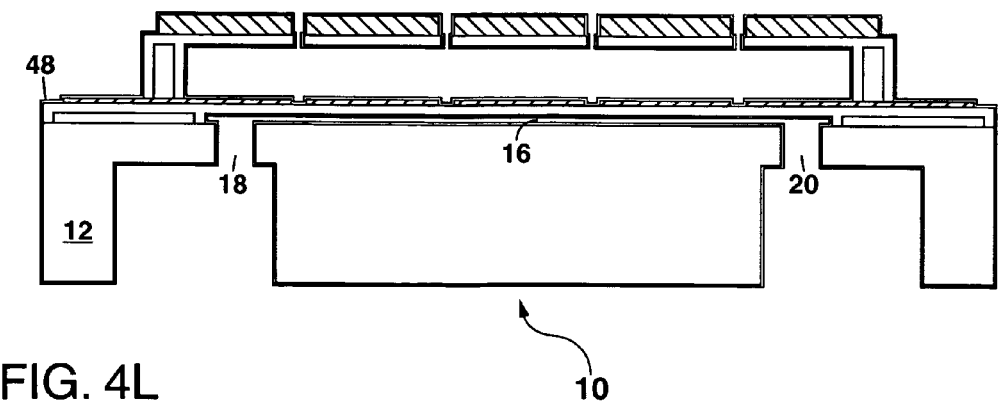

In FIG. 4L, the completed device 10 can be optionally covered with a layer 48 of parylene for improved biocompatibility and electrical insulation as will be described in detail hereinafter. The parylene layer 48 can be made thick enough to plug the openings 34 to hermetically seal the cavity 26 which can be advantageous. However, plugging the openings 34 will also generally increase the voltage 110 required to operate the device 10 since an ambient within the cavity 26 must be compressed as the first layer 14 is urged upwards.

Microfluidic tubing 30 can be attached to the completed device 10 to form the device 10 shown in FIG. 1B. Alternately, the completed device 10 can be attached to a microfluidic package as disclosed, for example, in U.S. Pat. Nos. 6,443,179 and 6,548,895 which are incorporated herein by reference.

Figure 5:
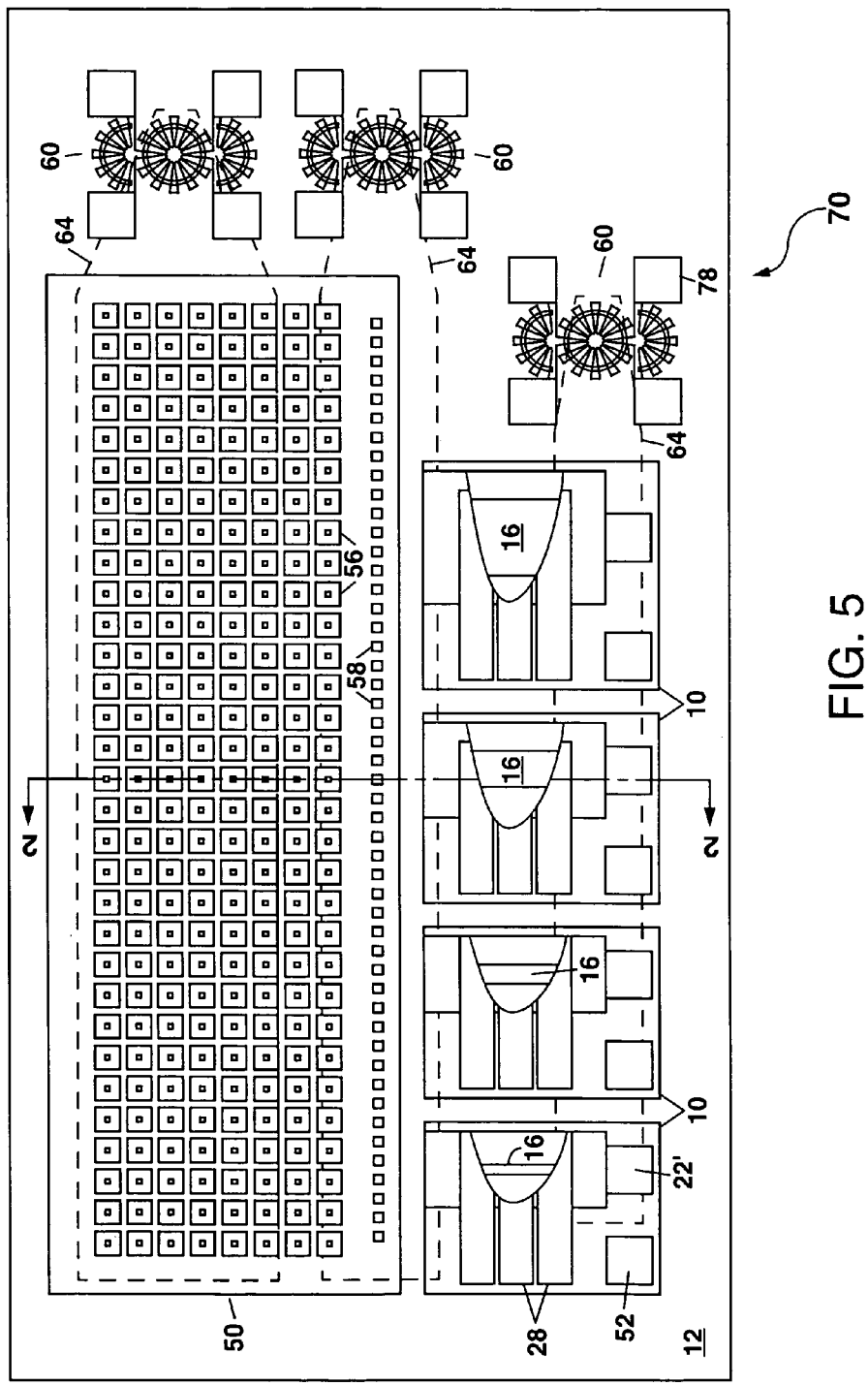
FIG. 5 shows a schematic plan view of an example of a MEM flow control assembly which includes a plurality of MEM flow control devices, a submicron filter and a plurality of pressure sensors all located on a common substrate.

A second example of the MEM flow control apparatus 10 of the present invention is shown in schematic plan view in FIG. 5. In this example, one or more MEM flow control devices 10 can be integrated on a substrate 12 together with a submicron filter 50 and a plurality of pressure sensors 60 to form a MEM flow control assembly 70 which is compact (e.g. 3 mm×6 mm in size). In FIG. 5, a cover 54 for the submicron filter 50 has been removed to show a plurality of filtration channels 56 therein.

In the example of FIG. 5, the various MEM flow control devices 10 are operable in parallel, with the fluid channel 16 in each device 10 having a different width. This is shown in the cutaway view of each MEM flow control device 10 in FIG. 5. By providing a plurality of devices 10 with different channel widths (e.g. 40 μm, 80 μm, 160 μm and 320 μm), a flow rate through the MEM flow control assembly 70 can be varied over a wide range, with each individual MEM flow control device 10 being operable digitally (i.e. to turn on or off the fluid flow through the channel 16 in that device 10) or analog (i.e. to continuously vary the fluid flow through the channel 16 in that device 10).

Each MEM flow control device 10 can include one or more first electrodes 22 and one or more second electrodes 28 formed above each first electrode 22. Electrical connections can be made to each first electrode 22 through a portion 22' of each the first electrode 22 which extends outside the cavity 26 to form a bond pad as shown in FIG. 5. The second electrodes 28 can also be extended as shown in FIG. 5 to form bond pads. Yet another bond pad 52 can be provided to make an electrical connection to the substrate 12. Each bond pad can be optionally metallized (e.g. with a metal such as aluminum or platinum).

The inlet port 18 of the fluid channel 16 of each MEM flow control apparatus 10 is in fluidic communication with an outlet side 58 (also termed a filter outlet) of the submicron filter 50. This can be done, for example, by removing a portion of the thermal oxide layer 38 to form an interconnection channel 64, or alternately by forming the interconnection channel 64 in or through the substrate 12. When one or more interconnection channels 64 are formed through the substrate 12 these channels 64 can be closed, as needed, on the backside 46 of the substrate 12 as shown in FIG. 6 by attaching the substrate 12 to a microfluidic package 120 which can provide fluidic and electrical connections into and out of the MEM flow control assembly 70.

The submicron filter 50 can comprise up to thousands or more filtration channels 56 which are connected in parallel. This can provide a relatively high flow rate (e.g. up to several tens of microliters per minute or more) of a fluid 100 through the filter 50 while filtering the fluid 100 to remove any particles larger than an predetermined size (e.g. ≧0.2 µm) that may be present in the fluid 100. The exact flow rate through the submicron filter 50 will depend upon the number and size of the filtration channels 56, and whether the fluid 100 is a liquid or a gas.

Figure 6:
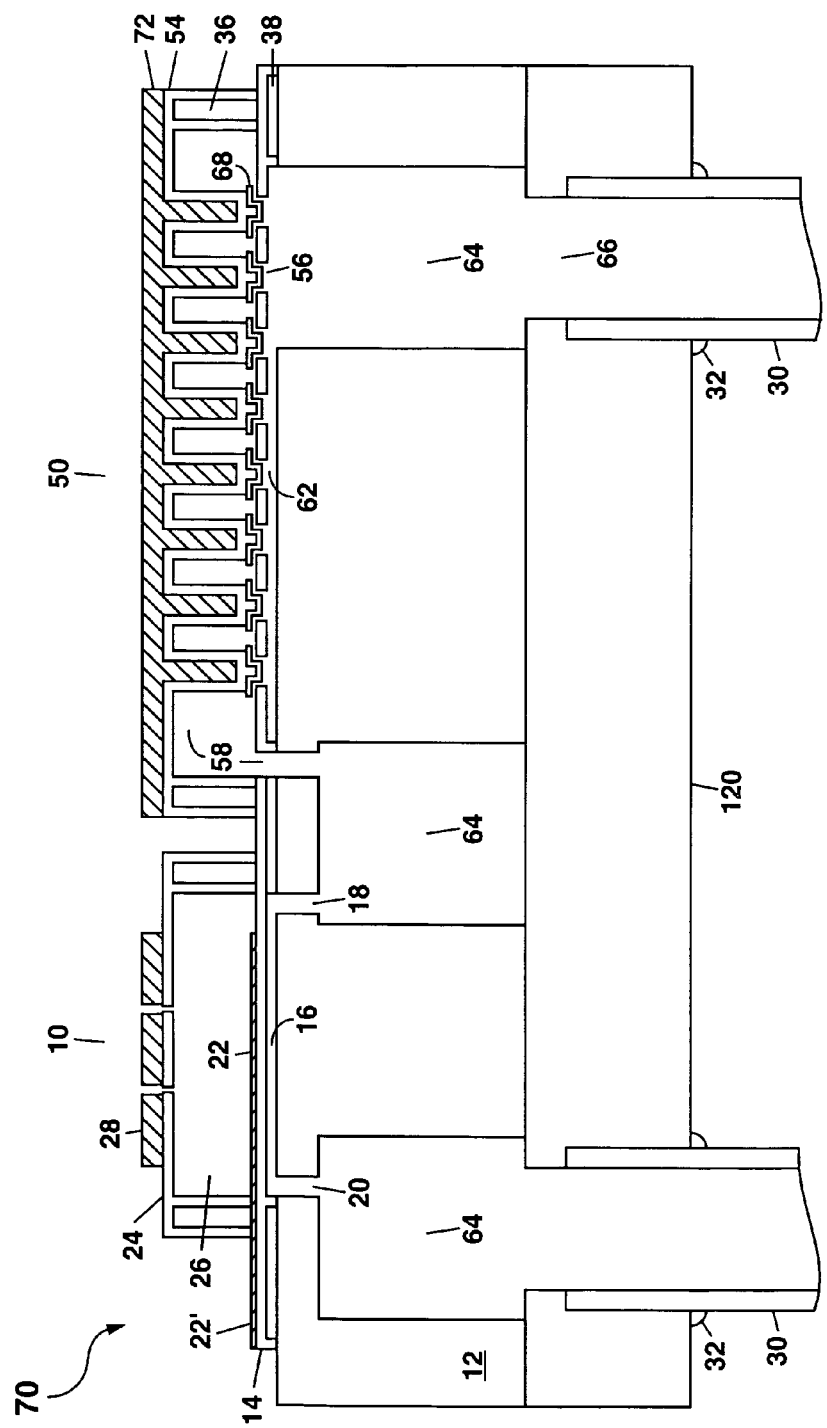
FIG. 6 shows a schematic cross-section view of the MEM flow control assembly of FIG. 5 along the section line 2-2 in FIG. 5.

The construction of the submicron filter 50 can be understood with reference to FIG. 6 which shows a schematic cross-section view along the section line 2-2 in FIG. 5. The submicron filter 50 can be built up using surface and bulk micromachining from the same material layers used to form the MEM flow control apparatus 10 previously described with reference to FIGS. 4A-4L. Some of these same material layers are also used to form the pressure sensors 60 which will be described hereinafter.

The thermal oxide 38 layer previously described with reference to FIG. 4A can be used to begin buildup of the submicron filter 50. This layer 38 will later be removed with a selective wet etching solution comprising HF to form an inlet side 62 (also termed a filter inlet) of the submicron filter 50 which extends below the filtration channels 56 and is in fluidic communication with a filter inlet port 66 that can be part of a microfluidic package 120 and which is in fluidic communication with the inlet side 62 of the submicron filter 50 and with an interconnection channel 64.

The first layer 14 of the nonconducting material (e.g. silicon nitride) can be blanket deposited over the thermal oxide 38 to begin to build up the filtration channels 56. The first layer 14 can be patterned to form an array of holes (e.g. square or of an arbitrary shape) therethrough at the locations where each filtration channel 56 is to be located. The holes in the array can be sized up to a few tens of microns on a size depending upon the space allocated for the submicron filter 50 and the number of filtration channels 56 to be provided therein.

A thin (e.g. 0.2 µm thick) layer of the sacrificial material 36 can then be deposited over the patterned first layer 14 to define one or more filtration passages through each filtration channel 56. This layer of the sacrificial material 36, which has been removed from the completed device using the selective wet etchant comprising HF, drapes into the micron-sized holes through the first layer 14 of the nonconducting material. The exact thickness of this layer of the sacrificial material 36 can be adjusted as needed to provide a predetermined pore size for the submicron filter 50.

A layer 68 of polysilicon can be deposited over the thin layer of the sacrificial material 36 to build up the filtration channels 56. This polysilicon layer 68, which can be about 0.3 µm thick, for example, can be the same polysilicon layer used to form the first electrodes 22 as previously described with reference to FIG. 4C. The polysilicon layer 68 can be patterned to form a square- or arbitrarily-shaped cap over each filtration channel 56. The polysilicon layer 68 can be directly interconnected to the first layer 14 through a plurality of openings through the intervening thin layer of the sacrificial material 36 about the periphery of the cap (e.g. at the corners of each square-shaped cap).

An additional layer of the sacrificial material 36 about 2 µm thick, for example, can be deposited over the substrate 12 and patterned to form openings down through the sacrificial material 36 to the patterned polysilicon layer 68 to expose the caps formed therefrom. The remaining sacrificial material 36 defines a filter outlet side 58 (also termed a filter outlet) of the submicron filter 50. Later, when the sacrificial material 36 is removed using the selective wet etchant comprising HF, the filter outlet will be opened up. This will allow the fluid 100 to enter the submicron filter 50 at the inlet side thereof and to pass through the filtration channels 56 to the outlet side of the filter 50, with any particles larger than a predetermined fraction of a micron (e.g. ⅕ µm) being removed by the filter 50.

The second layer 24 of the nonconducting material (e.g. silicon nitride) can then deposited over the sacrificial material 36 and into the openings down to the polysilicon layer 68. The second layer 24 forms a cover 54 over the submicron filter 50 and will hold the caps formed from the polysilicon layer 68 in place after the sacrificial material 36 is removed.

In FIG. 6, another polysilicon layer 72 can be deposited over the substrate 12 and patterned to further build up and reinforce the cover 54 over the submicron filter 50. This polysilicon layer 72, which can be 2.25 µm thick, can be the same polysilicon layer used to form the second electrodes 28 as previously described with reference to FIG. 4G.

The sacrificial material 36 can be removed from the inlet and outlet sides, 62 and 58, respectively using the HF etching solution. This can be done during the same selective etching step previously described with reference to FIG. 4K.

In the MEM flow control assembly 70, a plurality of pressure sensors 60 can also be optionally provided on the substrate 12 as shown in FIG. 5. These pressure sensors 60 are operatively connected to the filter inlet 62, to the filter outlet 58 and to the outlet port 20 of each MEM flow control apparatus 10 to sense the pressure of the fluid 100 at these locations. These connections can be made via interconnection channels 64 which can be formed through the substrate 14 as shown in FIG. 6. These interconnection channels 64 are shown in FIG. 5 as dashed lines.

Figure 7A:
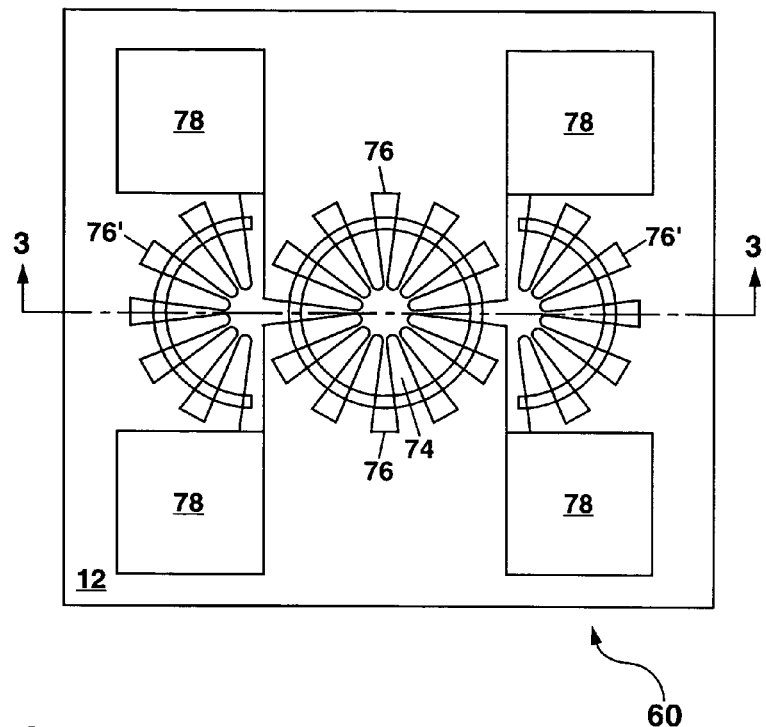
FIG. 7A shows an enlarged plan view of one of the pressure sensors in FIG. 5.
Figure 7B:
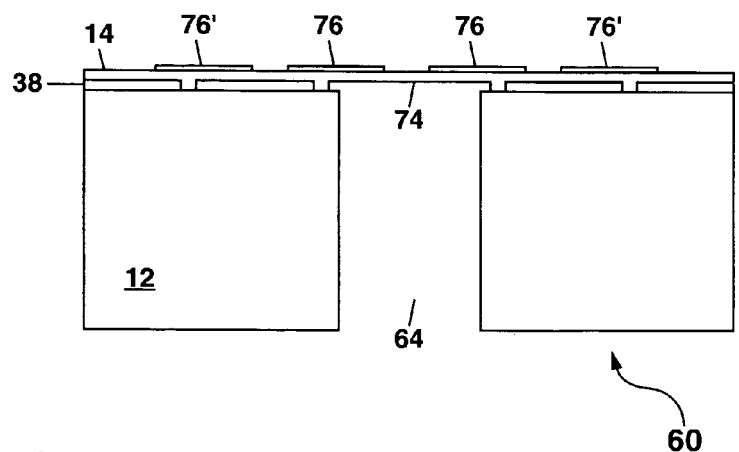
FIG. 7B shows a schematic cross-section view of the pressure sensor of FIG. 7A along the section line 3-3 in FIG. 7A.

An enlarged plan view of one of the pressure sensors 60 is shown in FIG. 7A; and a schematic cross-section view of the pressure sensor 60 is shown in FIG. 7B, taken along the section line 3-3 in FIG. 7A. Each pressure sensor 60 in FIGS. 7A and 7B comprises a circular pressure diaphragm 74 suspended over one of the interconnection channels 64, with the pressure diaphragm 74 being formed from the first layer 14 of the nonconducting material (e.g. silicon nitride). The pressure diaphragm 74, which can be, for example 100 µm in diameter and 0.8 µm thick, can move upward or downward in response to a change in the pressure of the fluid 100 in the interconnection channel 64. Movement of the pressure diaphragm 74 changes the resistance of one or more piezoresistors 76 which overlie at least a part of the pressure diaphragm 74. Additional reference piezoresistors 76' can be located on the first layer 14 outside the pressure diaphragm 74 (i.e. on an outer surface of the pressure diaphragm 74). The piezoresistors 76 and 76', which are folded back and forth a plurality of times in a radial pattern, can be electrically connected in a Wheatstone bridge configuration as shown in FIG. 7A, or alternately in a half-Wheatstone bridge configuration. In the Wheatstone bridge configuration, each piezoresistor 76 and 76' can be connected to a pair of bond pads 78, with each bond pad 78 also being used to connect a piezoresistor 76 to an adjacent reference piezoresistor 76'. The piezoresistors 76 and 76' can be formed from the polysilicon layer 68. The piezoresistors 76 and 76' can have a thickness of 0.3 µm, a width of 1-3 µm, and an overall length of about one millimeter.

The pressure sensors 60 which are operatively connected to the filter inlet 62 and the filter outlet 58 can be used to sense (i.e. measure) the pressure of the fluid 100 at these locations. Additionally, these two pressure sensors 60 allow a pressure differential (i.e. a difference in pressure) between the filter inlet 62 and the filter outlet 58 to be determined; and this can be used, in turn, to determine a flow rate of the fluid 100 through the submicron filter 50. A flow rate determination can be used, for example, to adjust the pressure of the fluid 100 provided to the filter inlet 62 when this is needed to provide a predetermined flow rate through the filter 50 so that an overall flow rate through the MEM flow control assembly 70 is determined by the plurality of MEM flow control devices 10 and not by the submicron filter 50. The flow rate determination can also be used to determine an extent of clogging of the filter with particles separated out of the fluid 100. This can be useful to determine when the filter 50 is nearing the end of its useful life.

The pressure sensor 60 which is operatively connected to the filter outlet 58 and another pressure sensor 60 which is operatively connected to the outlet port 20 of each MEM flow control device 10 can similarly be used to sense the pressure of the fluid 100 at these locations and to determine an overall flow rate through the parallel-connected fluid channels 16 of the MEM flow control devices 10. This is useful to calibrate and diagnose the operation of the MEM flow control devices 10, and to precisely adjust the overall flow rate during use of the MEM flow control assembly 70.

Electronic control circuitry can be optionally formed on the substrate 12 using well-known integrated circuit (IC) fabrication technology to read out the pressure sensors 60 and to control operation of the MEM flow control devices 10 to provide a predetermined overall flow rate through the device 70. Such electronic circuitry integrated with microelectromechanical devices is disclosed, for example, in U.S. Pat. No. 6,531,331 which is incorporated herein by reference.

The completed MEM flow control assembly 70 of FIG. 5 can attached to a microfluidic package 120 as shown in FIG. 6. Suitable microfluidic packages for practice of the present invention are disclosed, for example, in U.S. Pat. Nos. 6,443,179 and 6,548,895 which are incorporated herein by reference. The microfluidic package 120 can provide fluidic connections to the device 70 for supplying the fluid 100 and for receiving a controlled flow of the fluid 100 from the device 70. Additionally, the microfluidic package 120 can seal any open interconnection channels 64 within the device 70, as needed.

The completed MEM flow control assembly 70 of FIG. 5 or the MEM flow control apparatus 10 of FIGS. 1A and 1B can also be optionally coated with a layer of a material such as parylene to provide further electrical insulation and biocompatibility. This is schematically illustrated with reference to FIG. 4L and will now be described in detail. The parylene can be conformally deposited over exposed surfaces of the MEM flow control assembly 70 of FIG. 5 or the MEM flow control apparatus of FIGS. 1A and 1B using a conventional vapor deposition polymerization (VDP) apparatus which is well-known to the art.

Parylene is a transparent conformal biocompatible and electrically insulating coating that can be produced by the condensation and polymerization of a gaseous monomer, para-xylylene, at room temperature and in a vacuum environment of, for example, 20-70 milliTorr pressure using the VDP apparatus. Parylene is also available in three dimer forms designated as Parylene N (also termed di-para-xylylene or DPX-N), Parylene C (also termed dichloro-di-para-xylylene or DPX-C) and Parylene D (also termed tetra-chloro-di-para-xylylene or DPX-D).

A conformal parylene layer can be vapor deposited over all surfaces of the devices 10 and 70 which are exposed to the gaseous monomer or dimer, thereby lining these surfaces. This includes interior surfaces of the MEM flow control devices 10 including the fluid channel 16, the cavity 26 and the inlet and outlet ports 18 and 20. This also includes the interior of the submicron filter 50 including the flow channels 56, and the filter inlet 62 and the filter outlet 58; and the interconnection channels 64, and diaphragm 74 of the pressure sensors 60. Additionally, the parylene will provide a conformal electrically insulating and biocompatible coating over exterior surfaces of the MEM flow control devices 10 and the MEM flow control assembly 70 including any electrical wiring that may be attached thereto for providing electrical connections to the devices 10 and from the pressure sensors 60.

The thickness of the parylene layer to be conformally deposited on interior and exterior surfaces of the MEM flow control apparatus 10 and/or MEM flow control assembly 70 can be controlled by the VDP apparatus. As an example, the layer thickness of the parylene can be on the order of 0.1 µm or less within the submicron filter 50 and within the fluid channels 16, and can be up to about 1 µm or greater in more accessible portions of the devices 10 and 70 including the ports 18 and 20, the interconnection channels 64, and the exterior surfaces of the devices 10 and 70. In some instances, after forming a thin ($\leq 0.1$ µm) conformal coating of parylene inside the apparatus 10 or assembly 70, the backside of the substrate 12 can be clamped against a holding fixture or other flat surface within the VDP apparatus to apply one or more additional conformal parylene coatings over the exposed exterior surfaces of the devices 10 and/or 70. Further details of parylene deposition, which can be used for practice of the present invention, can be found in U.S. Pat. No. 3,342,754 which is incorporated herein by reference.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A microelectromechanical flow control apparatus, comprising:
   (a) a substrate;
   (b) a first layer of a nonconducting material disposed over the substrate to form a fluid channel which extends parallel to the substrate between an inlet port and an outlet port, with the inlet port, or the outlet port or both extending completely through the substrate to a backside thereof;
   (c) a first electrode formed on the first layer of the nonconducting material outside of the fluid channel;
   (d) a second layer of the nonconducting material disposed above the first layer of the nonconducting material to form a cavity which is completely outside of the fluid channel; and
   (e) a second electrode formed on an upper surface of the second layer of the nonconducting material above the first electrode, with the first layer of the nonconducting material being deformable away from the substrate to increase a cross-sectional size of the fluid channel in response to an electrostatic force of attraction produced by a voltage applied between the first and second electrodes.

2. The apparatus of claim 1 wherein the nonconducting material comprises silicon nitride.

3. The apparatus of claim 1 wherein the first and second electrodes comprise polycrystalline silicon, or a metal, or both.

4. The apparatus of claim 1 wherein the fluid channel is substantially free from any electric field produced by the voltage applied between the first and second electrodes.

5. The apparatus of claim 1 wherein the substrate is electrically conductive, and the first layer of the nonconducting material is deformable towards the substrate to decrease a cross-sectional size of the fluid channel when the voltage is applied between the first electrode and the substrate.

6. The apparatus of claim 1 wherein the fluid channel is lined with a layer of parylene.

7. A microelectromechanical flow control apparatus, comprising:
(a) a substrate which comprises silicon;
(b) a first layer of a nonconducting material disposed over the substrate to form a fluid channel which extends parallel to the substrate between an inlet port and an outlet port;
(c) a first electrode formed on the first layer of the nonconducting material outside of the fluid channel;
(d) a second layer of the nonconducting material disposed above the first layer of the nonconducting material to form a cavity which is completely outside of the fluid channel; and
(e) a second electrode formed on an upper surface of the second layer of the nonconducting material above the first electrode, with the first and second electrodes comprising polycrystalline silicon, or a metal, or both, and with the first layer of the nonconducting material being deformable away from the substrate to increase a cross-sectional size of the fluid channel in response to an electrostatic force of attraction produced by a voltage applied between the first and second electrodes.

8. A microelectromechanical flow control apparatus, comprising:
(a) a substrate;
(b) a first layer of a nonconducting material disposed over the substrate to form a fluid channel which extends parallel to the substrate between an inlet port and an outlet port;
(c) a first electrode formed on the first layer of the nonconducting material outside of the fluid channel;
(d) a second layer of the nonconducting material disposed above the first layer of the nonconducting material to form a cavity which is completely outside of the fluid channel;
(e) a second electrode formed on an upper surface of the second layer of the nonconducting material above the first electrode, with the first layer of the nonconducting material being deformable away from the substrate to increase a cross-sectional size of the fluid channel in response to an electrostatic force of attraction produced by a voltage applied between the first and second electrodes; and
(f) a submicron filter formed on the substrate proximate to the fluid channel and operatively connected thereto.

9. The apparatus of claim 8 wherein the submicron filter comprises a plurality of filtration channels operatively connected in parallel between a filter inlet and a filter outlet.

10. The apparatus of claim 9 wherein the submicron filter comprises a lining of parylene covering surfaces of the submicron filter which are to be exposed to a fluid.

11. The apparatus of claim 9 further comprising a first pressure sensor operatively connected to the filter inlet and a second pressure sensor operatively connected to the filter outlet.

12. The apparatus of claim 11 wherein the first and second pressure sensors each comprise a pressure diaphragm, and at least one piezoresistor formed on an outer surface of the pressure diaphragm.

13. The apparatus of claim 12 further comprising a third pressure sensor operatively connected to the outlet port, with the third pressure sensor comprising a pressure diaphragm, and at least one piezoresistor formed on an outer surface of the pressure diaphragm.

14. A microelectromechanical flow control apparatus, comprising:
(a) a silicon substrate;
(b) a first layer of silicon nitride disposed over the silicon substrate to form a fluid channel which extends parallel to the substrate between an inlet port and an outlet port, with the inlet port, or the outlet port or both extending completely through the silicon substrate to a backside thereof;
(c) a first electrode formed on the first layer of silicon nitride outside of the fluid channel;
(d) a second layer of silicon nitride disposed above the first layer of silicon nitride to form a cavity which is completely outside of the fluid channel; and
(e) a second electrode formed on an upper surface of the second layer of silicon nitride, with the first layer of silicon nitride being deformable away from the silicon substrate to increase a cross-sectional size of the fluid channel when an electrostatic force of attraction is produced by a voltage applied between the first and second electrodes.

15. The apparatus of claim 14 wherein the fluid channel is lined with a conformal layer of parylene.

16. The apparatus of claim 14 wherein the first and second electrodes comprise polycrystalline silicon, or a metal, or both.

17. The apparatus of claim 14 wherein the fluid channel is substantially free of any electric field due to the voltage applied between the first and second electrodes.

18. A microelectromechanical flow control apparatus, comprising:
(a) a silicon substrate which is electrically conductive;
(b) a first layer of silicon nitride disposed over the silicon substrate to form a fluid channel which extends parallel to the silicon substrate between an inlet port and an outlet port;
(c) a first electrode formed on the first layer of silicon nitride outside of the fluid channel;
(d) a second layer of silicon nitride disposed above the first layer of silicon nitride to form a cavity which is completely outside of the fluid channel; and
(e) a second electrode formed on an upper surface of the second layer of silicon nitride, with the first layer of silicon nitride being deformable away from the silicon substrate to increase a cross-sectional size of the fluid channel when an electrostatic force of attraction is produced by a voltage applied between the first and second electrodes, and with the first layer of silicon nitride being deformable towards the substrate to decrease a cross-sectional size of the fluid channel when the voltage is applied between the first electrode and the silicon substrate.

19. A microelectromechanical (MEM) flow control assembly for use with a fluid, comprising:
(a) a substrate;
(b) at least one MEM flow control apparatus formed on the substrate, with each MEM flow control apparatus further comprising:
(i) a first layer of a nonconducting material disposed over the substrate to form a fluid channel which extends parallel to the substrate between an inlet port and an outlet port;
(ii) a first electrode formed on the first layer of the nonconducting material outside of the fluid channel;
(iii) a second layer of the nonconducting material disposed above the first layer of the nonconducting material to form a cavity which is completely outside of the fluid channel; and
(iv) a second electrode formed on the second layer of the nonconducting material, with the first layer of the nonconducting material being deformable away from the substrate to increase a cross-sectional size of the fluid channel in response to an electrostatic force of attraction produced by a voltage applied between the first and second electrodes; and
(c) a submicron filter formed on the substrate and operatively connected to the inlet port of each MEM flow control apparatus to remove any particles from the fluid having dimensions larger than a fraction of a micron, with the submicron filter further comprising a plurality of filtration channels operatively connected in parallel between a filter inlet and a filter outlet.

20. The MEM flow control assembly of claim 19 further comprising at least one pressure sensor formed on the substrate and operatively connected to determine the pressure of the fluid.

21. The MEM flow control assembly of claim 20 wherein each pressure sensor comprises a pressure diaphragm, and a piezoresistor disposed, at least in part, over an outer surface of the pressure diaphragm.

22. The MEM flow control assembly of claim 19 wherein the fluid channel is lined with a layer of parylene.

23. A method for controlling a fluid flow, comprising:
providing a microelectromechanical (MEM) flow control apparatus and a submicron filter on a substrate proximate to each other, with the MEM flow control apparatus having:

a nonconductive membrane suspended over the substrate to form a fluid channel which extends parallel to the substrate between an inlet port and an outlet port;
a first electrode disposed on the nonconductive membrane outside the fluid channel; and
a second electrode superposed above the first electrode to form a cavity therebetween, with the cavity being located completely outside of the fluid channel;
filtering a fluid with the submicron filter prior to supplying the fluid to the inlet port of the MEM flow control apparatus under pressure;
providing a limited flow of the fluid between the inlet port and the outlet port of the MEM flow control apparatus; and
increasing the flow of the fluid between the inlet port and the outlet port by applying a voltage between the first electrode and the second electrode and thereby producing an electrostatic force of attraction which urges the nonconductive membrane away from the substrate to increase a cross-sectional size of the fluid channel.

24. The method of claim 23 further comprising providing a first pressure sensor on the substrate, with the first pressure sensor being operatively connected to an inlet side of the submicron filter, and sensing the pressure of the fluid entering the submicron filter with the first pressure sensor.

25. The method of claim 24 further comprising providing a second pressure sensor on an outlet side of the submicron filter, and sensing the pressure of the fluid exiting the submicron filter with the second pressure sensor.

26. The method of claim 25 further comprising sensing a flow rate through the submicron filter by determining a difference in pressure between the pressure of the fluid entering the submicron filter and the pressure of the fluid exiting the submicron filter.

27. The method of claim 26 further comprising providing a third pressure sensor on the substrate, with the third pressure sensor being operatively connected to the outlet port of the fluid channel, and sensing the pressure of the fluid exiting the fluid channel at the outlet port thereof.

28. The method of claim 27 further comprising sensing a flow rate through the fluid channel by determining the difference in pressure of the fluid exiting the submicron filter and the pressure of the fluid exiting the fluid channel at the output port thereof.

* * * * *